Patented July 23, 1929.

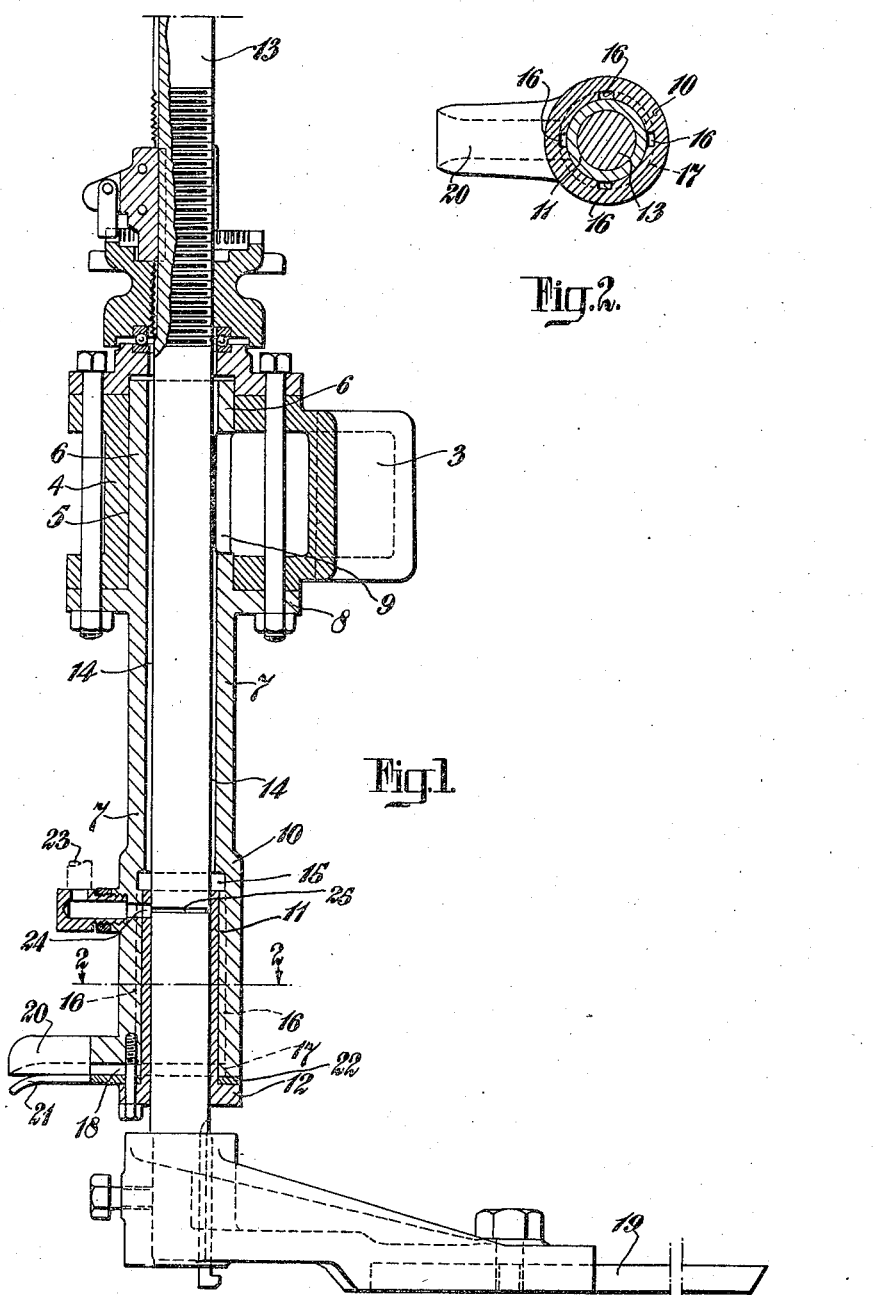

1,722,247

UNITED STATES PATENT OFFICE.

SYDNEY HUNT, OF BIRMINGHAM, ENGLAND.

MACHINE FOR THE MANUFACTURE OF GLASS ARTICLES.

Application filed September 3, 1927, Serial No. 217,443, and in Great Britain June 15, 1927.

This invention relates to machines for the manufacture of glass articles and refers more particularly to means for cooling the knife and parts operating the knife employed in some machines of the class in question for cutting off the trailing glass at the bottom of the parison mould as it is raised from the pot containing the molten glass.

According to the general principle of the invention the lower part of the knife shaft is carried in a hollow casing which is in connection on the one hand through a hollow supporting arm with a supply of cooling air, and on the other hand with means for discharging one or more streams of air on to the knife or other parts to be cooled. In this way, the lower portion of the knife shaft, which works in a highly heated zone, comes in a hollow chamber through which cooling air is constantly passing, and in addition the knife itself is cooled, when not in the cutting position.

The hollow arm carrying the casing and through which the cooling air is supplied, is suitably attached to or supported from the moving framework of the machine.

In order that the invention may be better understood, it will now be described with reference to the accompanying drawings in which:—

Fig. 1 shews a sectional elevation of the lower end of the knife shaft and bearings therefor, and Fig. 2 shews a section on line 2—2 Fig. 1.

The particular constructional embodiment of the invention shewn in the drawings is applicable to a rotary machine for making glass bottles having a plurality of parison moulds each adapted to be dipped in turn into a pot containing molten glass. A hollow arm 3 forming a conduit for cooling air is provided for carrying the knife which cuts off the trailing glass at the bottom of each of the said parison moulds.

Each of these arms 3 is closed at the end 4 and this end portion is formed with a vertical bore 5 into which a spigot-like sleeve 6 forming the upper end of the hollow casing 7 is fitted, the spigot 6 extending from the bottom to the top of the arm 3. This casing is provided with a flange 8 by means of which it is bolted to the lower side of the end of the arm 3.

The beforementioned spigot 6 is provided with a gap or opening 9 so disposed as to correspond with the hollow interior of the carrier arm 3, so that air can pass into the interior of the said spigot and thence down the casing.

The casing extends for a suitable distance downwards below its attaching flange and towards the lower end is enlarged at 10.

Into the enlarged bore is fitted a bush 11 which is flanged at the lower end 12 and attached to the casing 7, and which forms the lower bearing for the knife shaft 13, the said shaft passing upwards through the casing and out through the upper end of the spigot 6 as shewn.

The interior diameter of the casing 7 is of such dimension that a space 14 is left between it and the outer surface of the shaft 13 for the passage of the cooling air.

The upper end of the bush 11 comes a short distance from the upper end of the internal enlargement of the casing and an annular chamber 15 is thus constituted, the upper portion of which is in connection with the space 14 between the casing 7 and the surface of the shaft 13.

A number of vertical grooves 16 are provided connecting the annular space 15 with another annular space 17 at the lower end of the enlarged portion 10 of the casing 7 and these grooves 16 form ducts for the cooling air which passes down on the outside of the bush 11.

The lower annular space has connected thereto one or more outlets for the exit of air to the knife and parts to be cooled.

In one construction, and that shewn on the drawings, an outlet 18 is provided adapted to come over the knife 19 when the latter is in the out of action position. In a preferred construction the outlet comprises an inverted lip 20 to one portion of the hollow casing 7 coming over a lower downwardly directed lip 21 formed by an extension of a plate 22 clamped between the flange 12 of the bush 11 and the lower end of the casing 7 so that the emerging air is downwardly directed and blows upon the surface of the knife when it is turned by the shaft 13 into the required position.

Any number of exit nozzles of any desired shape may be provided according to the parts of the machine to which the streams of air are to be directed.

Suitable means are provided for supplying lubricant to the lower bearing of the shaft. For instance the lubricant may be supplied by means of a suitable pipe or the like 23 to an opening in the lower part of the casing 7 which coincides with an aperture 24 in the upper end of the bush 11, the knife shaft 13 having a slight groove 25 in its surface which coincides with this aperture 24.

It is to be observed that the particular construction described is given merely by way of example as to constructional details may be varied to suit the requirements of any particular machine without departing from the principles of the invention.

Having now particularly described and ascertained the nature of my said invention and in what manner the same is to be performed, I declare that what I claim is:—

1. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, and means for supplying cooling air to the interior of the said casing.

2. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, means for supplying cooling air to the interior of the said casing and means for discharging the said cooling air to the atmosphere.

3. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, means for supplying cooling air to the interior of the said casing and means for discharging the said cooling air to the parts to be cooled and to the atmosphere.

4. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, means for supplying cooling air to the interior of the said casing and means for discharging the said cooling air to the knife and to the atmosphere.

5. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, a hollow arm in connection with the framework of the machine, the said hollow arm carrying the said casing, and means for supplying cooling air to the interior of the hollow arm and thence to the interior of the said casing.

6. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, a hollow arm in connection with the framework of the machine the said hollow arm carrying the said casing, means for supplying cooling air to the interior of the hollow arm and thence to the interior of the said casing, and means for discharging the said cooling air to the atmosphere.

7. In a machine for the manufacture of glass articles, and of the type comprising a parison mould and a knife for cutting off trailing glass from the bottom of the said parison mould, said knife being operated by a rotatable shaft; a construction including a hollow casing in which the lower part of the knife shaft is carried, a hollow arm in connection with the framework of the machine, the said hollow arm carrying the said casing, means for supplying cooling air to the interior of the hollow arm and thence to the interior of the said casing and means for discharging the said cooling air to the parts to be cooled and to the atmosphere.

8. In a machine for the manufacture of glass articles, and of the type comprising a parison mould, and a knife for cutting off trailing glass from the bottom of the said parison mould, the said knife being operated by a rotatable shaft; a construction including a hollow casing in which the lower part of the knife shaft is carried, a hollow arm in connection with the framework of the machine, the said hollow arm carrying the said casing, means for supplying cooling air to the interior of the hollow arm and thence to the interior of the said casing and means for discharging the said cooling air to the knife and to the atmosphere.

9. In a machine for the manufacture of glass articles, and of the type comprising a parison mould and a knife for cutting off trailing glass from the bottom of the said parison mould, the said knife being operated by a rotatable shaft; a construction including a hollow casing, such hollow casing carrying a bush forming the lower bearing for the knife shaft, means for supplying cooling air to the interior of the said casing, at least one passage provided on the exterior of the said bush through which the cooling air is adapted to pass and means for discharging the said cooling air to the atmosphere.

10. In a machine for the manufacture of glass articles, and of the type comprising a parison mould and a knife for cutting off trailing glass from the bottom of the said parison mould, the said knife being operated by a rotatable shaft; a construction including a hollow casing, such hollow casing carrying a bush forming the lower bearing for the knife shaft, means for supplying cooling air to the interior of the said casing, at least one passage provided on the exterior of the said bush through which the cooling air is adapted to pass and means for discharging the said cooling air to the parts to be cooled and to the atmosphere.

11. In a machine for the manufacture of glass articles, and of the type comprising a parison mould and a knife for cutting off trailing glass from the bottom of the said parison mould, the said knife being operated by a rotatable shaft; a construction including a hollow casing, such hollow casing carrying a bush forming the lower bearing for the knife shaft, means for supplying cooling air to the interior of the said casing, at least one passage provided on the exterior of the said bush through which the cooling air is adapted to pass and means for discharging the said cooling air to the knife and to the atmosphere.

12. In a machine for the manufacture of glass articles, and of the type comprising a parison mould and a knife for cutting off trailing glass from the bottom of the said parison mould, the said knife being operated by a rotatable shaft; a construction including a hollow casing the lower portion of said casing being provided with a bore, the said bore being provided with at least one groove constituting a passage for air, a bush carried at the bottom of said bore, such bush forming the lower bearing for the knife shaft, means for supplying cooling air to the interior of said casing and to the groove in the bore and means for discharging the said cooling air to the atmosphere.

13. In a machine for the manufacture of glass articles, and of the type comprising a parison mould and a knife for cutting off trailing glass from the bottom of the said parison mould, the said knife being operated by a rotatable shaft; a construction including a hollow casing the lower portion of said casing being provided with a bore, the said bore being furnished with at least one groove constituting a passage for air, a bush carried at the bottom of said bore, such bush forming the lower bearing for the knife shaft, means for supplying cooling air to the interior of said casing and to the groove in the bore and means for discharging the said cooling air to the parts to be cooled and to the atmosphere.

14. In a machine for the manufacture of glass articles, and of the type comprising a parison mould and a knife for cutting off trailing glass from the bottom of the said parison mould, the said knife being operated by a rotatable shaft; a construction including a hollow casing the lower portion of said casing being provided with a bore, the said bore being furnished with at least one groove constituting a passage for air, a bush carried at the bottom of said bore, such bush forming the lower bearing for the knife shaft, means for supplying cooling air to the interior of said casing and to the groove in the bore and means for discharging the said cooling air to the knife and to the atmosphere.

15. In a machine for the manufacture of glass articles, and of the type comprising a parison mould and a knife for cutting off trailing glass from the bottom of the said parison mould, the said knife being operated by a rotatable shaft; a construction including a hollow casing in which the lower part of the knife shaft is carried, and means for supplying cooling air to the interior of the said casing, such casing being provided with at least one outlet so formed and disposed as to cause the emerging cooling air to be appropriately directed on the knife and knife carrier when these latter are turned into the inoperative position.

16. In a machine for the manufacture of glass articles, the combination with a casing, of a shaft journaled therein, a knife fixed to said shaft, and means for directing cooling air along the shaft and thence to the atmosphere.

17. In a machine for the manufacture of glass articles, the combination with a casing, of a shaft mounted therein, a lower bearing for the shaft carried by the casing, a knife fixed to the shaft adjacent the lower bearing and means for directing cooling air to said lower bearing.

18. In a machine for the manufacture of glass articles, the combination with a casing, of a shaft journaled therein, and a knife fixed to said shaft, said casing and shaft conjointly forming an annular space therebetween for receiving a supply of cooling air.

19. In a machine for the manufacture of glass articles, the combination with a casing, of a shaft journaled therein, and a knife fixed to said shaft, said casing and shaft conjointly forming an annular space therebetween for receiving a supply of cooling air, the casing being provided with an outlet for directing the cooling air against the knife.

20. In a machine for the manufacture of glass articles, the combination with a casing, of a shaft journaled therein and projecting beyond one end thereof, a bushing disposed between the casing and said end of the shaft, and a knife fixed to the projecting end of the shaft, said casing and shaft conjointly forming an annular space therebetween for receiving a supply of cooling air, said space being located above the bushing, the casing being formed with an outlet passage communicating with the space and with the atmosphere at a point adjacent the lower end of the bushing for directing the cooling air against the knife.

21. In a machine for the manufacture of glass articles, the combination with a casing, of a shaft journaled therein and projecting beyond one end thereof, a bushing disposed between the casing and said end of the shaft, a knife fixed to the projecting end of the shaft, said casing and shaft conjointly forming an annular space therebetween for receiving a supply of cooling air, said space being located above the bushing, the casing being formed with an outlet passage communicating with the space and with the atmosphere, and upper and lower lips extending laterally from the casing above the knife and forming therebetween a passage for directing the cooling air against the knife.

22. In a machine for the manufacture of glass articles, the combination with a casing, of a shaft journaled therein and projecting beyond one end thereof, a bushing disposed between the casing and said end of the shaft, an outwardly extending flange on the lower end of the bushing, a knife fixed to the projecting end of the shaft, said casing and shaft conjointly forming an annular space therebetween for receiving a supply of cooling air, said space being located above the bushing, the casing being formed with an outlet passage communicating with the space and with the atmosphere, and upper and lower lips extending laterally from the casing above the knife and forming therebetween a passage for directing the cooling air against the knife, the lower lip being clamped between the flange of the bushing and the lower end of the casing.

In witness whereof I affix my signature.

SYDNEY HUNT.